United States Patent [19]
Kant et al.

[11] Patent Number: 4,730,490
[45] Date of Patent: Mar. 15, 1988

[54] CONTAINER HAVING A DEVICE FOR THE ELECTRIC MEASUREMENT OF THE LEVEL OF A LIQUID CONTAINED WITHIN IT

[75] Inventors: Bernhard Kant, Eschborn; Hans-Georg Lauth, Schmitten, both of Fed. Rep. of Germany

[73] Assignee: VDO Adolf Schindling AG, Frankfurt am Main, Fed. Rep. of Germany

[21] Appl. No.: 889,460

[22] Filed: Aug. 26, 1986

Related U.S. Application Data

[62] Division of Ser. No. 623,733, Jun. 22, 1984, Pat. No. 4,621,526.

[30] Foreign Application Priority Data

Jun. 25, 1983 [DE] Fed. Rep. of Germany ....... 3322906

[51] Int. Cl.$^4$ ............................................. G01F 23/24
[52] U.S. Cl. ..................................... 73/304 R; 338/13
[58] Field of Search ................ 73/304 R; 338/13, 38; 340/620

[56] References Cited

U.S. PATENT DOCUMENTS

| 3,578,409 | 5/1971 | Silverman et al. | 338/13 X |
| 3,792,407 | 2/1974 | Ehrenfried et al. | 338/13 |
| 4,196,625 | 4/1980 | Kern | 73/304 R |
| 4,331,185 | 5/1982 | Rinaldo et al. | 141/95 |
| 4,621,526 | 11/1986 | Kant et al. | 338/13 X |

FOREIGN PATENT DOCUMENTS 3108969 9/1982 Fed. Rep. of Germany .

Primary Examiner—Daniel M. Yasich
Attorney, Agent, or Firm—Martin A. Farber

[57] ABSTRACT

A container (1) formed of two half shells has wall ribs (3, 4) extending parallel to each other from one side down to the lowest point in the container. A conductive foil (5) is fastened by rivets to said wall ribs. The conductive foil serves for measuring the level in the container. It is wetted on both sides by the liquid in the container. As a result, the resistance of the conductive foil (5) changes, as can be determined in an evaluation device. It is important that the conductive foil be held by holding means of the container wall (2) so that it can positively reach the lowermost point of the container and participate in deformations of the container.

3 Claims, 8 Drawing Figures

CONTAINER HAVING A DEVICE FOR THE ELECTRIC MEASUREMENT OF THE LEVEL OF A LIQUID CONTAINED WITHIN IT

This is a division of application Ser. No. 623,733 filed June 22, 1984, now U.S. Pat. No. 4,621,526.

FIELD AND BACKGROUND OF THE INVENTION

The invention refers to a container having a device for the electric measurement of the level of a liquid contained within it, which device comprises a strip-shaped conductive foil adapted to be washed by the liquid on both of its surfaces, for instance an externally electrically heated resistance foil, or a capacitance foil formed of at least two conductors.

A device for measuring the level of a liquid, intended for an automobile gasoline tank, is already described in senior German Patent Application No. P 32 35 534.3. This known device is inserted into the tank from the top so that there are no problems of sealing openings in the container. The device must be long enough that it extends as far as possible to the bottom of the tank since in measurement of the level the precision of the measurement with a low level of liquid is generally more important than with a high level of liquid. Unfortunately, the distance from the top of the tank to the bottom of the tank varies considerably since the manufacturing tolerances of such tanks are large and the bottom of the tank bulges downward due to the weight of the fuel.

In order nevertheless to obtain a sufficiently high precision of measurement even in the region of lower liquid levels elastic foil holders have been developed which rest resiliently against the bottom of the tank. It is also known to hold rigid foil holders continuously against the bottom of the tank by a spring. Such constructions are, however, rather expensive and are seldom used due to considerations of cost.

It is an object of the invention to develop a container having a device for the electric measurement of the level of the liquid contained in it by which a very accurate measurement of the level of the liquid contained in it is possible without the measuring device having to be made complicated for this purpose but with great freedom with regard to the configuration of the container.

SUMMARY OF THE INVENTION

According to the invention, the container wall (2) has within the container (1) holding means (for instance wall ribs 3, 4) for the direct or indirect holding of the conductive foil (5).

Since, according to the invention, the conductive foil is held within the container by the wall of the container, it can extend, independently of tolerances of the container, down to the lowest point in the container. Even deformations of the container, for instance by the bulging of the bottom of the container as a result of the weight of the liquid contained in it, do not affect the precision of measurement of the device since the conductive foil necessary moves together with the wall of the container. Since containers such as, for example, automobile gas tanks are generally made of plastic, the production of the holding means does not afford any difficulty; on the contrary, they can be produced with the container in a single operation.

One structurally very simple embodiment of the invention is characterized by the fact that the holding means are two inwardly directed wall ribs (3, 4) which extend parallel to each other and between or on which the conductive foil (5) is fastened.

The conductive foil is preferably fastened to the wall ribs (3, 4) by rivets (6, 7) or by welding.

In addition to this direct attachment of the conductive foil it is, however, also possible to insert the foil in a foil holder and hold the foil holder between the wall ribs, in the manner that the conductive foil (5) is inserted in a foil holder (8) which surrounds the foil on all sides and is provided with flood and vent channels or a foil holder (8) provided with webs (10) and that the foil holder (8) is held between the wall ribs (3, 4). In this embodiment it is possible to insert the conductive foil into the foil holder outside of the container and then install the foil holder into the container, which is advantageous from an assembly standpoint.

It is favorable if the foil holder (15) is tubular and if the wall ribs (16, 17) partially grip around the outside of the foil holder (15), since in this case recourse may be had to ordinary foil holders and since containers having such wall ribs can be easily produced.

A channel which surrounds the foil holder in the manner that the foil holder (15) is tubular and the holding means are developed as a channel which surrounds the foil holder is advantageous in particular if the container is to be lined with foam since the channel then makes possible the subsequent mounting of the foil holder after the lining with foam.

It is also favorable if the foil holder (8) is prismatic and is held at its two narrow sides by one projection (11, 12) each within a groove (13, 14) in each wall rib (3, 4). The mounting of such a foil holder can be effected in the manner that it is pushed from above into the two wall ribs. It is also possible to bend the wall ribs somewhat apart and then push the foil holder in between the wall ribs from the front side until it engages into the two grooves.

Another embodiment which is favorable from a manufacturing standpoint consists in forming the holding means by an outwardly directed container pocket (18, 19, 20).

The container pocket (18, 19) can have an open slot (19) towards the container (1) over its entire length or else the container pocket (18, 19) can be substantially closed towards the container and have a liquid connection with the container (1) only within the region of the bottom of the container. This latter solution contributes to damping.

The container pocket (18, 19) can be so shaped that an ordinary cylindrical protective tube (15) or oval protective tube containing the conductive foil (5) finds room in it.

It is also possible to develop the pocket (20) with two guide grooves (21, 22) arranged opposite each other and in which the conductive foil (5) is directly held.

An alternative manner of attachment of the conductive foil (5) consists in arranging it in a prismatic holder (8) which is held standing on its narrow side in the container pocket (23). The foil holder (8) can be is connected to the container pocket (23) by welding from the outside. As an alternative to this, the container pocket (18, 23) can be pushed together from the outside and thereby the foil holder (15, 8) can be held fast in the foil pocket.

It is also favorable if the foil holder (8), represents a chamber provided with well-defined openings (10) since in such case the level of the liquid in the foil holder changes only slightly even upon vibrations and thus damping occurs. The construction of the container with the measuring device is particularly simple if the holding means are lugs or eyes provided at one or more places of the container wall (2).

The invention permits numerous embodiments.

BRIEF DESCRIPTION OF THE DRAWINGS

With the above and other objects and advantages in view, the present invention will become more clearly understood in connection with the detailed description of preferred embodiments when considered with the accompanying drawings, of which.

DETAILED DESCRIPTION OF THE PREFERRED EMBODIMENTS

Figure 1:
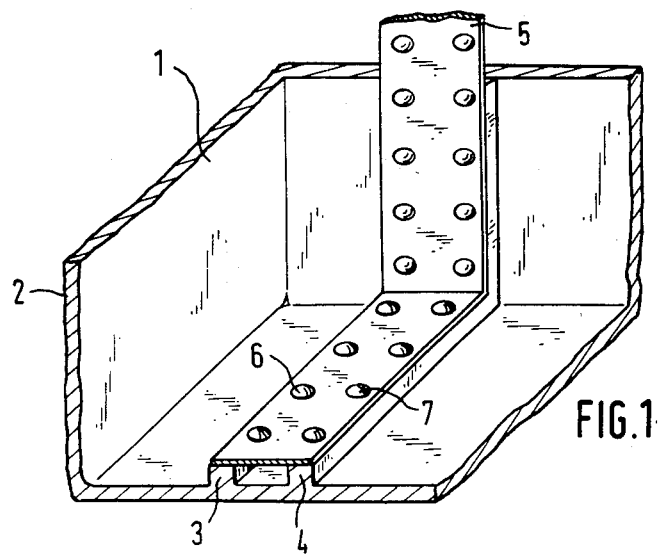
FIG. 1 is a section through a partial region, essential for the invention, of a container according to the invention seen in perspective.
Figure 2:
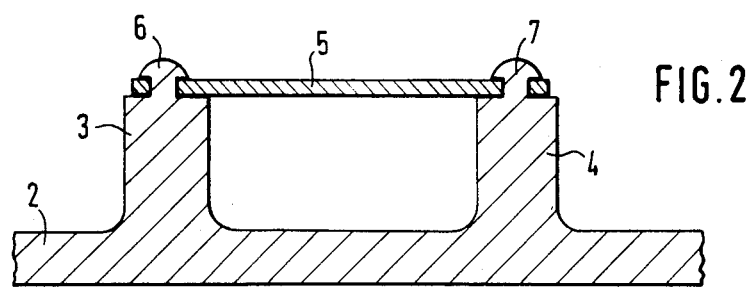
FIG. 2 is a cross section through the container of FIG. 1 in the region of a conductive foil for level measurement.

FIG. 1 shows a container 1 produced as customary from two half shells (not shown), the container wall 2 having two inwardly directed wall ribs 3, 4 which extend parallel to each other. On the wall ribs 3, 4 there lies a conductive foil 5 which-as can be more clearly noted from FIG. 2-is held on the wall ribs 3, 4 by rivets 6, 7. It is not shown that the wall ribs 3, 4 together with the conductive foil 5 extend only up to the lowest point of the container 1. In this way liquid can flow from the lowest point parallel to the wall ribs 3 into the space defined by the wall ribs 3, 4 and the conductive foil 5. The conductive foil 5 is thus wetted on both sides by liquid within the container 1 so that a measurement of the level is possible when the conductive foil 5 is provided in known manner with electric energy and the change in resistance occurring due to the liquid is detected by an evaluation circuit.

Figure 3:
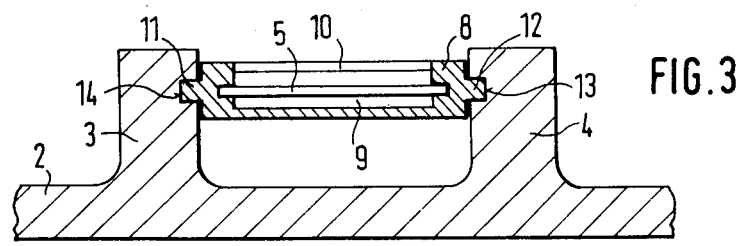
FIG. 3 is a cross section through a second embodiment of a container within the region of a conductive foil for level measurement.

In the embodiment shown in FIG. 3, the conductive foil 5 is not held directly by the wall ribs 3, 4 but by a foil holder 8 which, in its turn, is held between the wall ribs 3, 4. The foil holder 8 has a prismatic cross section and forms a chamber 9 into which liquid can enter through well-defined openings 10. On each of its two narrow sides the foil holder 8 has a projection 11, 12 which engages into a corresponding groove 13, 14 in the wall ribs 4, 3 so that the foil holder 8 is held between the wall ribs 3, 4. The foil holder can be mounted from the front when the wall ribs 3, 4 are bent apart. It is, of course, also possible to insert the foil holder into the grooves 13, 14 from above.

Figure 4:
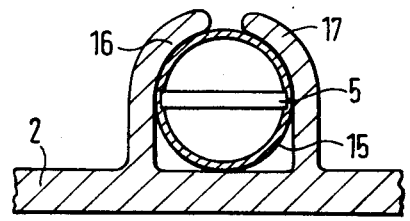
FIG. 4 is a cross section through a third embodiment of a container in the region of a conductive foil for level measurement.

In the embodiment shown in FIG. 4 a tubular foil holder 15 is provided which bears the conductive foil 5. This foil holder 15 is held on the wall 2 of the container 1 in the manner that wall ribs 16, 17 extend in part over the tubular foil holder 15. These wall ribs 16, 17 need not necessarily grip only partially over the foil holder 15 but can also pass into each other to form a single structural part and then surround the foil holder 15 like a pipe clamp. The wall ribs 16, 17 can extend, in exactly the same way as the wall ribs 3, 4 from above down to the lowermost point of the container 1. However, it is also possible to arrange them only at individual places. One then obtains individual lugs or eyes which hold the foil holder 15.

Figure 5:
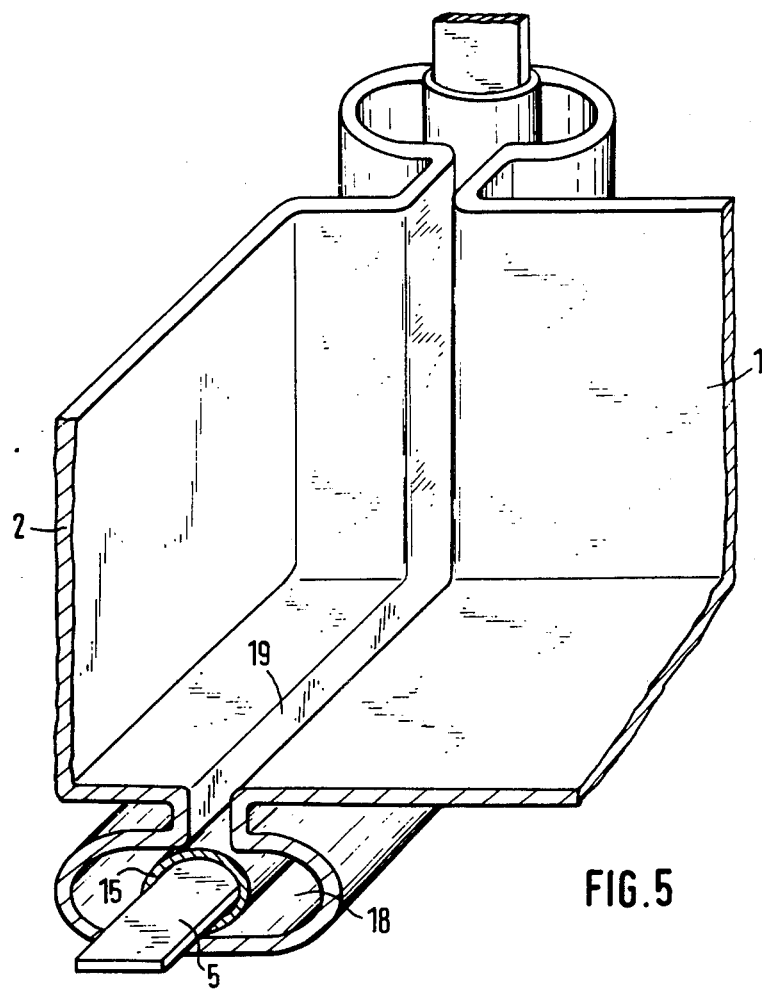
FIG. 5 is a section through a partial region, essential for the invention, of another embodiment of a container according to the invention, seen in perspective.

In the embodiment shown in FIG. 5 the container 1 has an outwardly directed container pocket 18 in which again there is arranged a tubular foil holder 15 holding the conductive foil 5. The container pocket 18 is open over its entire length towards the container 1 via a slot 19. The container pocket 18 may, however, also be closed and the container wall 2 contacts itself in the region of the slot 19. It is also possible to press the container pocket 18 together from the outside and in this way hold the foil container 15 firmly within the container pocket 18. Even in an embodiment without slot 19 it is of course necessary, in precisely the same way as in the one in accordance with FIG. 1, for liquid to be able to pass from the container 1 into the container pocket 18, which is possible by a liquid inlet (not shown) at the lowest point.

Figure 6:
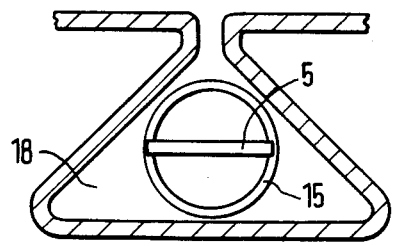
FIG. 6 is a cross section through another embodiment of a container in the region of its conductive foil.

FIG. 6 shows that the container pocket 18 need not necessarily be oval in cross section but may also have the shape of a triangle. Within this triangular container pocket 18 there is arranged, precisely as described above, a tubular foil holder 15 having a conductive foil 5.

Figure 7:
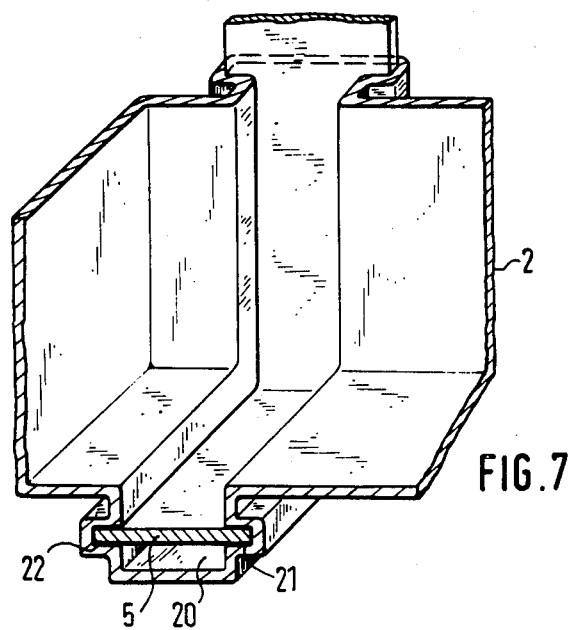
FIG. 7 is a section through a partial region, essential for the invention, of another container developed in accordance with the invention, seen in perspective.

In the embodiment shown in FIG. 7, the conductive foil 5 is inserted directly into a container pocket. For this purpose the container wall 2 within the region of the container pocket 20 is so developed that two parallel extending guide grooves 21, 22 which face each other are produced, into which grooves the two longitudinal sides of the conductive foil 5 engage so that the conductive foil is held in this way.

Figure 8:
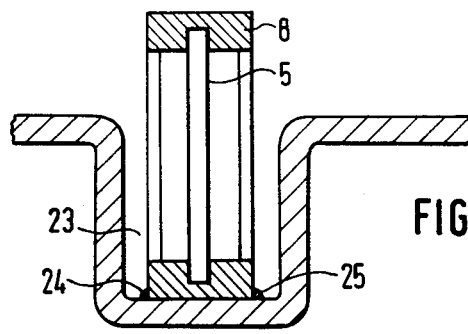
FIG. 8 is a cross section through a modified embodiment of the container in the region of its conductive foil.

In the embodiment shown in FIG. 8, a container pocket 23 is made so large that the foil holder 8, standing on its narrow side, finds space within this container pocket 23. The foil holder 8 can be held in the container pocket 23 from the outside by weld spots 24, 25.

In the case of an electrically externally heated resistance foil, the foil is heated by passing electric current through the resistance. Both terminals of the resistance are led to the upper end of the protective tube and are converted as the resistance probe in U.S. Pat. No. 4,361,037.

We claim:

1. In a container having a device for the electric measurement of the level of a liquid contained therein, which device comprises a strip-shaped contained therein, which device comprises a strip-shaped conductive foil adapted to be contacted by the liquid on both of its surfaces, the improvement wherein the container comprises a container wall, and holding means of said wall for holding the conductive foil in communication with the inside of the container, the foil being uniformly spaced apart from the positioned alongside a surface of the container wall; and wherein said holding means are wall ribs formed on said container wall, and rivets fasten said conductive foil to said wall ribs.

2. In a container having a device for the electric measurement of the level of a liquid contained therein, which device comprises a strip-shaped conductive foil adapted to be contacted by the liquid on both of its surfaces, the improvement wherein the container comprises a container wall, and holding means of said wall for holding the conductive foil in communication with the inside of the container, the foil being uniformly spaced apart from and positioned alongside a surface of the container wall, and wherein said holding means is formed by an outwardly directed container pocket, and the pocket is formed with two guide grooves arranged opposite each other and in which the conductive foil is directly held.

3. In a container having a device for the electric measurement of the level of a liquid contained therein, which device comprises a strip-shaped conductive foil adapted to be contacted by the liquid on both of its surfaces, the improvement wherein the container comprises a container wall, and holding means of said wall for holding the conductive foil in communication with the inside of the container, the foil being uniformly spaced apart from and positioned alongside a surface of the container wall; and wherein said holding means is formed on said container wall.

* * * * *